United States Patent
Vincent et al.

(10) Patent No.: US 9,171,135 B2
(45) Date of Patent: Oct. 27, 2015

(54) METHOD FOR ACQUISITION OF SOFTWARE APPLICATIONS

(75) Inventors: Christophe Vincent, Cesson Sevigne Cedex (FR); Marc Eluard, Cesson Sevigne Cedex (FR); Yves Maetz, Cesson Sevigne Cedex (FR)

(73) Assignee: Thomson Licensing (FR)

( * ) Notice: Subject to any disclaimer, the term of this patent is extended or adjusted under 35 U.S.C. 154(b) by 180 days.

(21) Appl. No.: 13/382,151

(22) PCT Filed: Jul. 1, 2010

(86) PCT No.: PCT/EP2010/059353
§ 371 (c)(1),
(2), (4) Date: Feb. 27, 2012

(87) PCT Pub. No.: WO2011/000906
PCT Pub. Date: Jan. 6, 2011

(65) Prior Publication Data
US 2012/0192284 A1 Jul. 26, 2012

(30) Foreign Application Priority Data
Jul. 3, 2009 (FR) .................................. 09 54574

(51) Int. Cl.
*G06F 21/00* (2013.01)
*G06F 21/10* (2013.01)
(Continued)

(52) U.S. Cl.
CPC .............. *G06F 21/10* (2013.01); *G06F 21/105* (2013.01); *G06F 21/60* (2013.01); *G06F 21/602* (2013.01);
(Continued)

(58) Field of Classification Search
CPC ......... G06F 21/10; G06F 21/12; G06F 21/60; G06F 21/62; G06F 2211/007; G06F 2221/2107; H04L 9/00; H04L 9/28; H04L 9/0861; H04L 9/0877; H04L 9/0894; H04L 9/0897; H04L 2209/12; H04L 29/066; H04L 63/04; H04L 63/08
USPC .................. 726/1–10, 26–33; 713/164–167, 713/171–174, 189–194; 380/259–263, 380/42–43, 28–29
See application file for complete search history.

(56) References Cited

U.S. PATENT DOCUMENTS

| 5,182,770 A | 1/1993 | Medveczky et al. |
| 5,357,573 A | 10/1994 | Walters |

(Continued)

FOREIGN PATENT DOCUMENTS

| DE | 9109977 | 2/1993 |
| DE | 19963471 | 5/2001 |

(Continued)

OTHER PUBLICATIONS

Search Rept: Aug. 11, 2010.

*Primary Examiner* — Madhuri Herzog
(74) *Attorney, Agent, or Firm* — Jack Schwartz & Associates, PLLC

(57) ABSTRACT

A method for acquisition of a software application stored on a software application distribution unit and intended to be supplied to a user computer unit is disclosed wherein, the user computer unit communicates an item of identification information identifying the software application to be acquired to an electronic security module connected to the user computer unit. The module generates, using a secret and identification information, an item of user information and transmits it with the identification information to the unit. The unit protects with the user information the software application identified by the identification information and the protected software application is transmitted to the user computer unit. Thus, the software application is protected with an item of information from the electronic security module of the user. The protected software application then has its protection removed on an electronic security unit equipped with an electronic security module.

8 Claims, 2 Drawing Sheets

(51) Int. Cl.
    *H04L 9/08* (2006.01)
    *G06F 21/60* (2013.01)
    *H04L 29/06* (2006.01)
    *G06F 21/62* (2013.01)
    *G06F 21/86* (2013.01)

(52) U.S. Cl.
    CPC ............ *G06F 21/606* (2013.01); *H04L 9/0861* (2013.01); *H04L 9/0877* (2013.01); *H04L 63/04* (2013.01); *G06F 21/62* (2013.01); *G06F 21/6218* (2013.01); *G06F 21/86* (2013.01); *G06F 2221/0711* (2013.01); *G06F 2221/0755* (2013.01); *G06F 2221/0797* (2013.01)

(56) References Cited

U.S. PATENT DOCUMENTS

| | | | |
|---|---|---|---|
| 5,991,399 A * | 11/1999 | Graunke et al. | 380/279 |
| 6,195,432 B1 * | 2/2001 | Takahashi et al. | 380/277 |
| 7,363,507 B2 | 4/2008 | Rick | |
| 2002/0029347 A1 | 3/2002 | Edelman | |
| 2003/0105970 A1 | 6/2003 | Pei Jen | |
| 2003/0123667 A1 * | 7/2003 | Weber et al. | 380/277 |
| 2005/0033983 A1 | 2/2005 | Takekawa et al. | |
| 2005/0204405 A1 | 9/2005 | Wormington et al. | |
| 2006/0259981 A1 | 11/2006 | Ben-Shoshan | |
| 2008/0104706 A1 * | 5/2008 | Karp et al. | 726/26 |
| 2010/0058064 A1 * | 3/2010 | Kirovski et al. | 713/176 |

FOREIGN PATENT DOCUMENTS

| | | |
|---|---|---|
| EP | 0561685 | 9/1993 |
| EP | 1128250 | 8/2001 |
| ES | 2179775 | 1/2003 |
| JP | 2002374244 | 12/2002 |
| JP | 2004040209 | 2/2004 |
| JP | 2008282238 | 11/2008 |
| TW | 200511097 | 3/2005 |
| TW | 200849059 | 12/2008 |

* cited by examiner

METHOD FOR ACQUISITION OF SOFTWARE APPLICATIONS

This application claims the benefit, under 35 U.S.C. §365 of International Application PCT/FR2010/059353, filed Jul. 1, 2010, which was published in accordance with PCT Article 21(2) on Jan. 6, 2011 in English and which claims the benefit of French patent application No. 0954574, filed Jul. 3, 2009.

DOMAIN OF THE INVENTION

The present invention relates to the acquisition of protected software from a software distribution unit and their protection on a user computer unit.

TECHNOLOGICAL BACKGROUND OF THE INVENTION

There currently exists a significant need to prevent the illegal copy and/or use of software applications. Up to the present, three protection techniques are known to prevent the illegal copying and/or use of software applications.

The first technique, requiring no specific hardware, consists in providing with the software a password or secret key to prevent individuals who do not have this pass word using the software. The password is for example a series number pre-recorded in the software. The software is then only authorized to function if the password entered by the user corresponds to the pre-recorded password. The software and the password are preferably transmitted separately to the user. The disadvantage of this technique is that the password may be, intentionally or not, divulged by the client. The level of protection of such a technique is thus not very high.

The second technique, commonly called "hardware soldering" consists in extracting one or several physical parameters of the computer intended to receive the software and in customizing the software with the physical parameter(s) so that it is authorized to function only on the computer having the extracted physical parameter(s). This physical parameter can be for example a MAC address. The application is thus authorized to function only on the computer having this MAC address. The disadvantage of this technique is that the client can use the software only on a single computer and can not even change computer.

Finally, a third technique consists in associating an electronic security module with the software. This electronic security module is provided with the software at time of purchase. The electronic security module designates an integrated circuit comprising a non-volatile memory (ROM) with items of secret information, for example the usage rights of a software application. Such an electronic security module is found for example in the form of a hardware lock or "dongle" At start-up and/or different execution stages of the software, the software verifies the presence of usage rights in the electronic security module and only continues its execution if the usage rights associated with said software are present in the electronic security module. With this technique, a software application is authorized to function on a computer only if the electronic security module comprising the usage rights to this software is connected to this computer. Such an electronic security module being difficult to copy or duplicate, illegal use of the software becomes unlikely. The disadvantage of this technique is that, the electronic security module being attached to a specific software application, the protection of n software applications requires the provision of n electronic security modules.

SUMMARY OF THE INVENTION

The invention aims to overcome some or all of the disadvantages described above. In particular, one purpose of the invention is to propose a solution enabling a plurality of software applications to be protected with a single electronic security module, said electronic security module being employed at each new software acquisition and at each use of the software application.

According to the invention, an electronic security module belonging to the user who wants to acquire a software application is used. This module contains information that is specific to the user and that are not linked to a specific software application. According to the invention, the electronic security module of the user communicates to the distribution unit an item of user information, said user information is then used by the distribution unit to protect the software application prior to communicating it to the user. Hence, the user receives the software application that is protected on the basis of an item of user information delivered by the electronic security module. Only this user, by means of his electronic security module, is then in a position to remove the protection of the software application received.

More specifically, the invention relates to a method for acquisition of a software application stored in a software application distribution unit, said application comprises at least one instruction and is intended to be supplied to a computer unit of a user, called a user computer unit, said method being characterized in that it comprises the following steps:
  a step of generating, in an electronic security module connected to said user computer unit, an item of user information specific to said user that is associated with an item of identification information identifying the software application to be supplied, said user information being generated from a secret stored in said electronic security module,
  a step of transmitting via the electronic security module of said user information and of said identification information to the software application distribution unit,
  a step of processing, in a software application distribution unit, at least one instruction from the software application identified by said identification information by means of a protection function using said user information, in a way to protect said software application, and
  a step of communicating, via the software application distribution unit, the protected application to said user computer unit and possibly said identification information.

According to a particularity of the invention, the user information is generated from said secret and the identification information of the application to be acquired. The user information is generated by applying a derivation function on said identification information using the secret contained in the security module. Consequently, the user information generated by the electronic security module changes with each new software application acquisition.

According to a particularity of the invention the method is repeated with the same electronic security module for the acquisition of a plurality of software applications. Hence, a single electronic security module is used to acquire different software applications.

The invention also relates to a method for processing for the purpose of removing protection, on a user computer unit to which is connected said electronic security module, from a protected software application acquired according to the method described above. This user computer unit may or may not be the user computer unit used during the acquisition. If this user computer unit is different to that used during the acquisition, the protected application is transferred into this new user computer unit prior to removal of the protection.

The method for processing comprises the following steps:
regenerating, in said electronic security module, the user information associated with the protected software application, and
processing the protected software application by means of a function, called the protection removal function, using said user information, able to remove protection from a protected application by means of the protection function of the software application distribution unit.

According to a particular embodiment, the protection removal function is present in the electronic security module. The processing of the protected software application by means of said protection removal function is thus carried out in the electronic security module then the application with protection removed is communicated to the user computer unit.

As a variant, the protection removal function is present in the user computer unit. The processing of the protected software application by means of said protection removal function is carried out in the user computer unit using the user information generated by said user electronic module.

BRIEF DESCRIPTION OF THE FIGURES

The invention will be better understood, and other aims, details, characteristics and advantages will appear more clearly over the course of the detailed description which follows in referring to the figures in the appendix, showing in.

DETAILED DESCRIPTION OF THE INVENTION

The invention relates to a method for acquisition of a protected software application and a method for removal of the protection of this protected software application.

More specifically, the invention relates to a method for acquisition of a software application stored in a software application distribution unit, said application comprises at least one instruction and is intended to be supplied to a computer unit of a user, called a user computer unit. This method comprises the following steps:
a step of generating, in an electronic security module connected to said user computer unit, an item of user information specific to said user that is associated with an item of identification information identifying the software application to be supplied, said user information being generated from a secret stored in said electronic security module,
a step of transmitting via the electronic security module of said user information and of said identification information to the software application distribution unit,
a step of processing, in a software application distribution unit, at least one instruction from the software application identified by said identification information by means of a protection function using said user information, in a way to protect said software application, and
a step of communication, via the software application distribution unit, of the protected application to said user computer unit and possibly said identification information.

Thus, the software application transmitted by the software applications distribution unit is protected via an item of user information provided by the electronic security module of the user. This same electronic security module is used each time the user wants to download a software application. At each new acquisition of an application, the electronic security module delivers an item of user information and the software application distribution unit uses this user information to protect the application. Hence, a single electronic security module is used to acquire different software applications.

The method for processing aiming to remove the protection of the software application can be implemented in any user computer unit equipped with an electronic security module.

Figure 1:
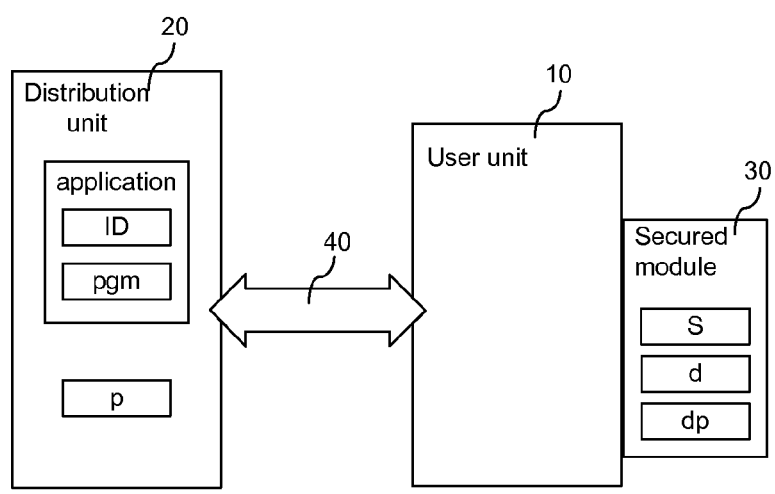
FIG. 1, the simplified diagram of a system able to implement the method according to a particular embodiment of the invention, FIG. 2, a diagram showing the steps to transmit a software application according to a particular embodiment of the invention, and FIG. 3, a diagram showing the steps to execute the application transmitted according to the diagram of FIG. 2 according to a particular embodiment of the invention.

FIG. 1 shows a system able to implement the method for acquisition of a protected software application and the method for protection removal according to a particular embodiment of the invention. This system comprises a user computer unit 10 communicating, via a communication network 40, with a software application distribution unit 20. The software application distribution unit 20 is a server, a database, a computer, etc.

The application distribution unit 20 stores a plurality of software applications. For each software application, the unit 20 stores the computer programme pgm of the application and an item of identification information ID. The unit also stores a function p, called protection that will serve to protect the application to be supplied to the user computer unit 10.

The user computer unit 10 designates any device type able to exchange information or data with a unit and to which can be connected an electronic security module of dongle or smartcard type. This user computer unit is for example a games console or mobile telephone belonging to the user.

An electronic security module 30 is connected to the user computer unit 10. The electronic security module 30 designates, within the scope of the invention, an integrated circuit comprising at least one item of secret information and at least one derivation function using said secret information. The electronic security module 30 is connected to an input/output port of the user computer unit 10, for example a USB port, or is connected to the user computer unit 10 via a specific interface device, for example a smartcard reader. It can be in different forms, notably in the form of a dongle or smartcard.

In a variant, the electronic security module 30 is internal to the user computer unit 10 and has for example the form of a TPM (Trusted Platform Module) module.

In the example of the system shown in FIG. 1, the electronic security module 30 contains a secret S, a derivation function d to generate an item of user information and another protection removal function dp to remove the protection of software applications protected by the protection function p. These different functions are described in more detail hereafter.

The transmission network 40 is a network, such as the is telephone network, able to transport data between the user computer unit 10 and the software application distribution unit 30.

Figure 2:
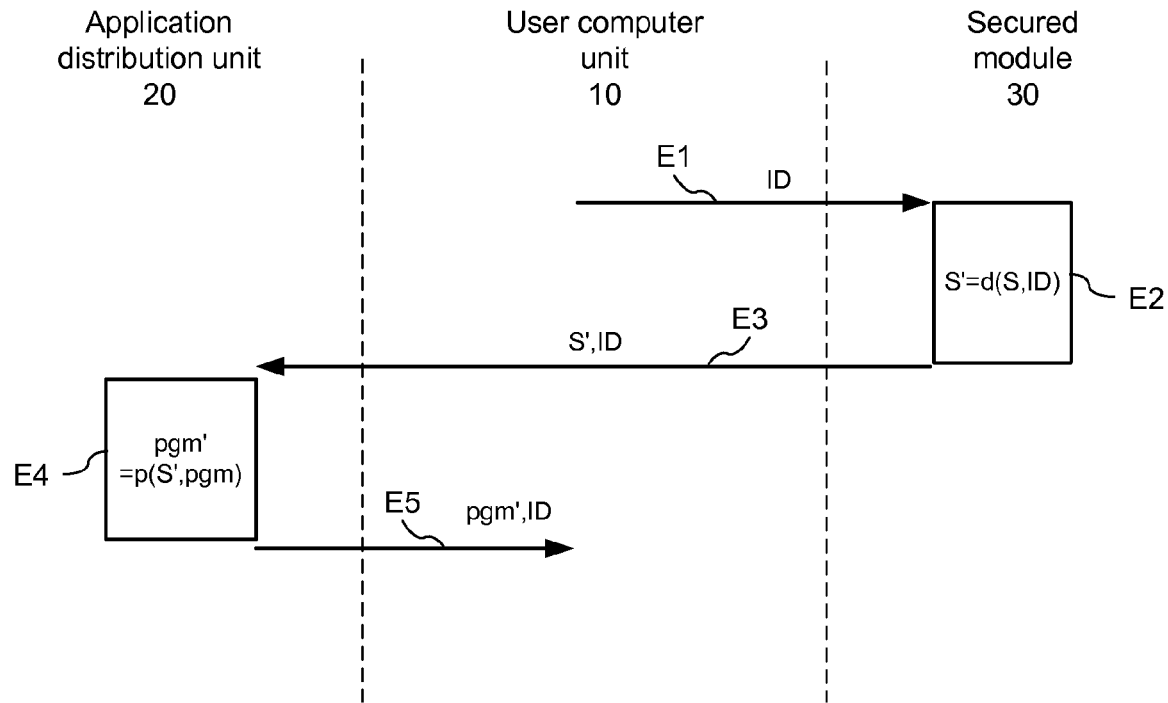

According to a particular embodiment of the invention, the acquisition of an application from the software application distribution unit 20 via the user computer unit 10 is carried out as shown in FIG. 2.

According to a first step E1, the user computer unit 10 communicates the identification information ID identifying the software application to be acquired to the electronic security module 30, this identification information ID having been previously supplied to the user computer unit 10 by the unit 20 and selected by the user in a list of identification information.

According to a step E2, the electronic security module 30 generates, using its secret S, an item of user information S' that is associated with the identification information ID. The user information S' is generated by applying the derivation function d on the identification information ID, the derivation function d using the secret S. Then we have S'=d(S,ID). The derivation function d is for example an algorithm DES (Data Encryption Standard) using the secret S as an encryption key and the identification information ID as data. According to another non-restrictive example, the derivation function is a logical function realising an Exclusive-OR operation between the identification information and the secret S.

As a variant, the electronic security module 30 generates from the secret S the user information S' then associates it with the identification information ID, the link between the information S' and the identification information ID being stored in a memory of the module 30.

According to a step E3, the electronic security module 30 transmits the user information S' and the identification information ID to the software application distribution unit 20 via the user computer unit 10. Advantageously, this transmission is carried out on a security authenticated channel well known in the encryption domain. The security authenticated channel enables data to be securely transited between two authenticated entities so that a third party can not have knowledge of or modify the information thus transmitted.

According to a step E4, the software application distribution unit 20 then protects at least one instruction of the programme pgm identified by the identification information ID by means of the protection function p using the user information S'. The protection function p is for example an encryption algorithm of AES (Advanced Encryption Standard) type using the user information S' as an encryption key. The protection function p is applied to one or several instruction of the software application or over the totality of the instructions of the application. This gives: pgm'=p(S',pgm) where pgm' designates the protected version of the software application pgm.

According to a step E5, the software application distribution unit 20 communicates to the user computer unit 10 the protected software application pgm' and the associated identification information ID. In a variant, the software application distribution unit 20 only communicates with the protected application pgm', the identification information ID having been saved in the user computer unit at step E3.

Each time the client wants to acquire a new application this process is reiterated using the same electronic security module 30. At each new application acquisition the electronic security module 30 delivers an item of user information S' that is preferably new.

All the protected applications received by the user computer unit 10 can then have their protection removed using the electronic security module 30 used for the acquisition.

The protected application supplied by the unit 20 can then have its protection removed on the user computer unit 10 that was used in the acquisition, or after transfer, on another user computer unit 10'. It suffices simply to connect the electronic security module 30 having served in the acquisition to the user computer unit on which the user wants to remove the protection of the application. The protection removal operation can be carried out before the execution of the application or during the execution of the application.

Figure 3:
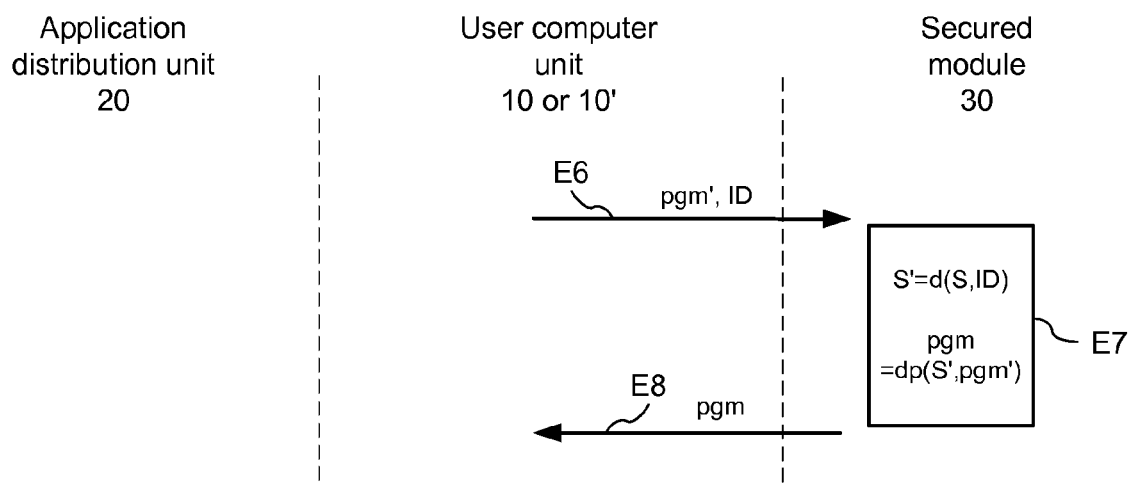

The protection removal operation is shown in FIG. 3. The electronic security module 30 is connected to the user computer unit 10 or 10'.

According to a step E6, the user computer unit 10 or 10' transmits to the electronic security module 30 the protected programme pgm' and the identification information ID of the application.

According to a step E7, the electronic security module regenerates, from the secret S and the identification information ID, the user information S' associated with the identification information ID by performing S'=d(S,ID) then removes protection from the protected programme pgm' by means of the protection removal function dp using the user information S'. The programme with protection removed pgm=dp(S',pgm') is thus obtained, which is transmitted via the electronic security module 30 to the user computer unit 10 or 10' (step E8).

In a variant, the protection removal operation is performed in the user computer unit. In this variant, the protection removal function dp is present in the user computer unit 10 or 10' and the protected programme pgm' is not transmitted to the electronic security module 30. The electronic security module 30 generates the user information S' from the identification information ID then transmits it to the user computer unit. This latter removes the protection from the application pgm' using user information S' supplied by the module 30.

With this method, the application is protected in the software application distribution unit with an item of user information S' from the user and, once transmitted to the user, the protected software application can have its protection removed on any user computer unit to which is connected the electronic security module used during the acquisition of the software application. Hence the software application can be acquired or downloaded from a first computer unit then have its protection removed on another unit. Moreover, this method only requires a single electronic security module to acquire a plurality of software applications.

Though the invention has been described in relation to a specific embodiment, it is evident that this is in no way restricted and that it comprises all technical equivalents of the means described as well as their combinations if these enter into the scope of the invention.

The invention claimed is:

1. A method for acquisition of a software application stored in a software application distribution unit, said application includes at least one instruction and said application is intended to be supplied to a user computer unit, wherein the method comprises:

generating, in an electronic security module connected to said user computer unit, user information that is associated with identification information identifying the software application to be supplied, said user information being generated from at least a secret stored in said electronic security module and from the identification information, transmitting via the electronic security module said user information and said identification information to the software application distribution unit, processing, in a software application distribution unit, the at least one instruction from the software application identified by said identification information by a protection function using said user information, to generate a protected software application, and communicating, via the software application distribution unit, the protected software application to said user computer unit.

2. The method according to claim 1, wherein the user information is generated by applying a derivation function to said identification information using said secret.

3. The method according to claim 1, wherein said method is repeated by the same electronic security module for the acquisition of a plurality of software applications.

4. A method on a user computer unit connected to said electronic security module to remove protection from a protected software application acquired according to the method of claim 1, the method comprising:
   regenerating, in said electronic security module, the user information associated with the protected software application, and
   processing the protected software application by a protection removal function, to remove protection from a protected application by said protection function.

5. The method according to claim 4, wherein the protection removal function resides in the electronic security module and the processing of the protected application by said protection removal function is carried out in said electronic security module, the application with protection removed being communicated to the user computer unit.

6. The method according to claim 4, wherein the protection removal function resides in the user computer unit and the processing of the protected application by said protection removal function is carried out in said user computer unit using the user information generated by said electronic security module.

7. An electronic security module adapted to be connected to a user computer unit, comprising at least a secret and at least a derivation function wherein, for the acquisition of a software application stored in a software application distribution unit and supplied to the user computer unit, the electronic security module generates user information that is associated with identification information identifying the software application to be supplied, said user information being generated by applying the derivation function to said identification information using said at least one secret; and the electronic security module transmits via the user computer unit said user information and said identification information to the software application distribution unit in order for the software application distribution unit to generate a protected software application by a protection function using said user information, the protection function applied to at least one instruction from the software application identified by said identification information, wherein the electronic security module comprises an integrated circuit.

8. The electronic security module according to claim 7, further comprising a protection removal function, able to remove protection from a protected application by a protection function in the software application distribution unit, using said user information.

* * * * *